(12) United States Patent
Horn et al.

(10) Patent No.: US 6,298,743 B1
(45) Date of Patent: Oct. 9, 2001

(54) SELECTOR LEVER FOR AN AUTOMATIC GEARBOX

(75) Inventors: Heinz Horn, Reichenschwand; Wolfgang Hese, Lauf, both of (DE)

(73) Assignee: HKR Haas GmbH & Co. Kunststoff KG, Reichenschwand (DE)

( * ) Notice: Subject to any disclaimer, the term of this patent is extended or adjusted under 35 U.S.C. 154(b) by 0 days.

(21) Appl. No.: 09/462,579

(22) PCT Filed: Jul. 11, 1998

(86) PCT No.: PCT/EP98/04320

§ 371 Date: May 8, 2000

§ 102(e) Date: May 8, 2000

(87) PCT Pub. No.: WO99/02895

PCT Pub. Date: Jan. 21, 1999

(30) Foreign Application Priority Data

Jul. 11, 1997 (DE) .............................. 197 29 678

(51) Int. Cl.$^7$ .................................................. B60K 20/00
(52) U.S. Cl. ....................................... 74/473.3; 74/483 PB
(58) Field of Search ............................. 74/523, 537, 538, 74/473.3, 473.1, 483 PB

(56) References Cited

U.S. PATENT DOCUMENTS

| | | |
|---|---|---|
| 4,747,278 | 5/1988 | Roncelli et al. . |
| 4,774,850 * | 10/1988 | Shovlin ................................. 74/475 |
| 5,181,592 | 1/1993 | Pattock . |
| 5,247,849 * | 9/1993 | Sato ....................................... 74/475 |
| 5,617,760 * | 4/1997 | Woeste et al. .......................... 74/475 |

FOREIGN PATENT DOCUMENTS

| | | |
|---|---|---|
| 39 09 565 | 10/1990 | (DE) . |
| 195 06 766 | 2/1996 | (DE) . |
| 44 27 695 | 2/1996 | (DE) . |
| 44 34 135 | 3/1996 | (DE) . |
| 195 13 809 | 10/1996 | (DE) . |
| 0 300 268 | 1/1989 | (EP) . |
| 0 459 485 | 12/1991 | (EP) . |
| 0 709 597 | 5/1996 | (EP) . |
| 56-29723 * | 3/1981 | (JP) . |

* cited by examiner

*Primary Examiner*—David Fenstermacher
(74) *Attorney, Agent, or Firm*—Venable; Gabor J. Kelemen

(57) ABSTRACT

The invention relates to a selector lever for an automatic gearbox, comprising a handle (13) with a hollow shaft (3) connected thereto; a stop bar which can move in an axial direction (11) in the hollow shaft (3) between a stop position and a release position, wherein the stop bar of the selector lever (1) can pivot into various shift positions and is fixed in a selected shift position when the stop bar is in a stop position; and a guided actuating part (5) in said handle, pertaining to an actuating device (11) running parallel to an axial direction, said part being used to displace the stop bar into a release or stop position. The invention is characterized in that at least one wedge surface (16a,16b) of the actuating part (5) co-operates with at least one counter surface in the manner of a wedge ballader gear, said counter surface forming part of a sliding piece (6) which is forcibly guided in an axial direction (11) in the handle (13) which is coupled to the actuating end (7) of the stop bar facing the handle (13) during movement by means of a non slack-free or moveable connection in the actuating device (11).

6 Claims, 8 Drawing Sheets

Figure 1:
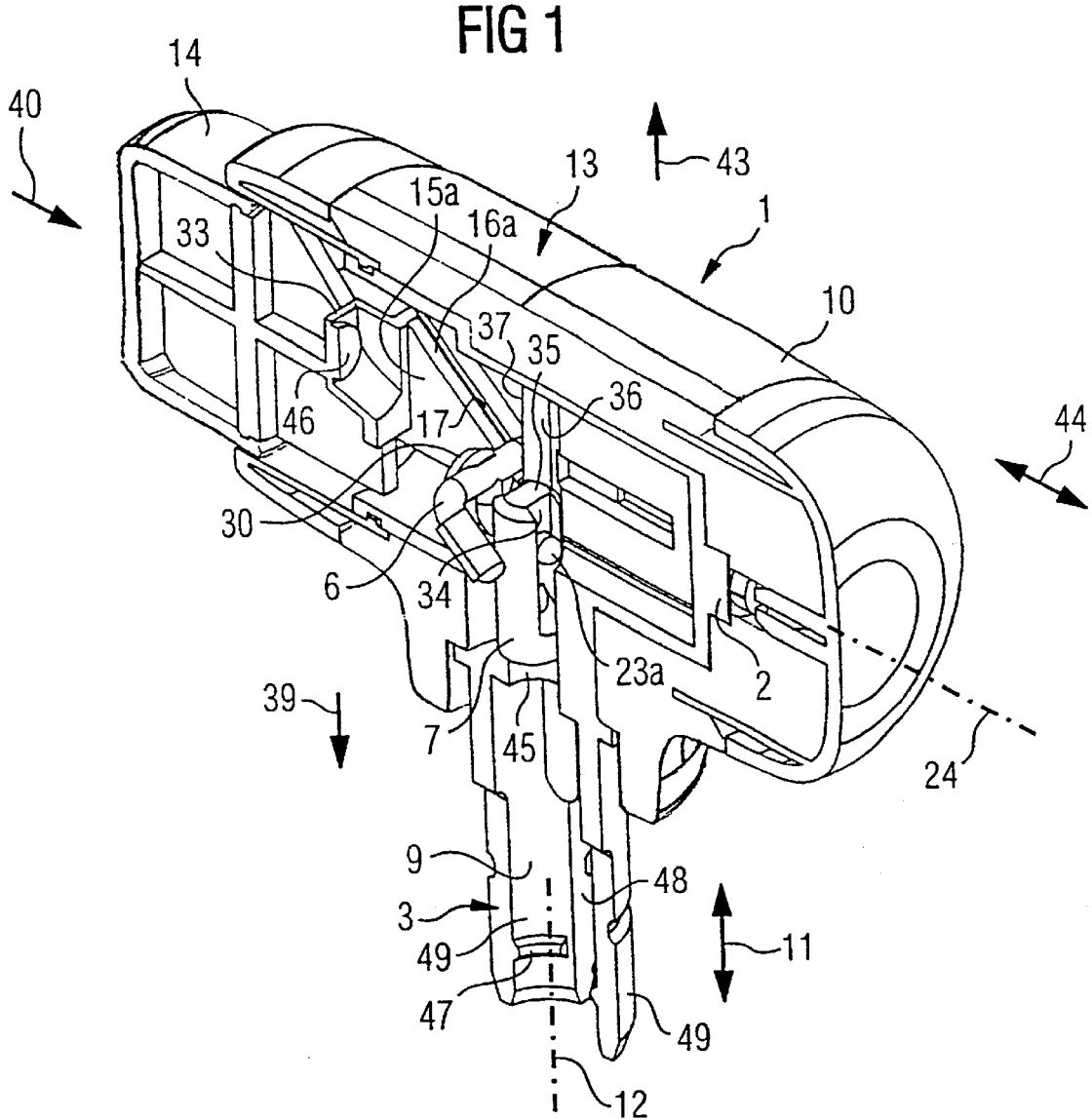

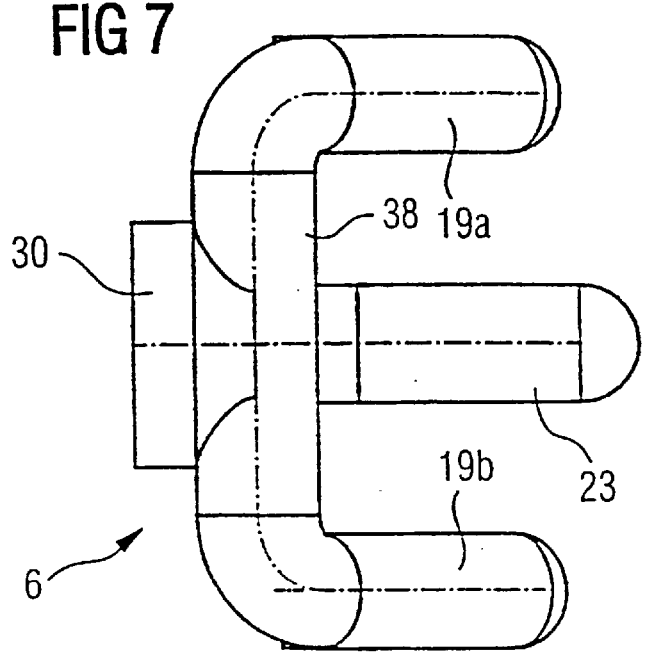
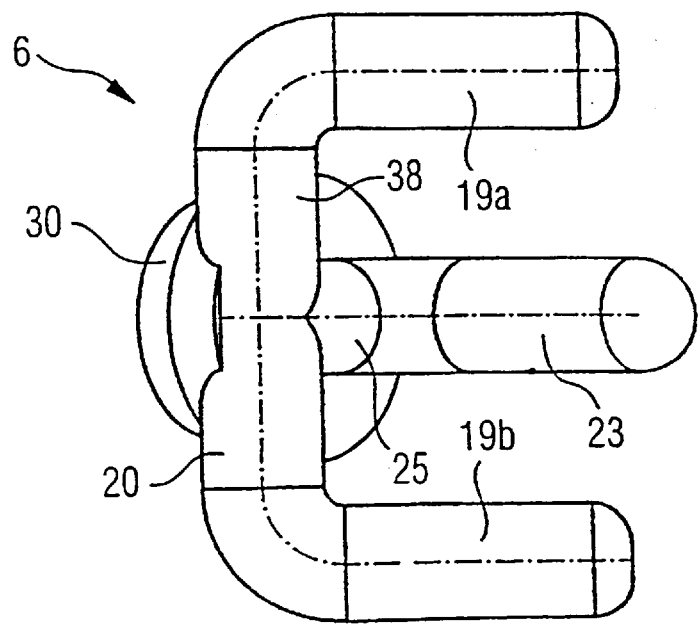

SELECTOR LEVER FOR AN AUTOMATIC GEARBOX

The invention relates to a selector lever for automatic transmissions, which is used to control the gearbox of a motor vehicle and to select various shift positions. It comprises a handle with attached hollow shaft, inside of which a stop bar can be moved in axial direction between a release position and a stop position. In the stop position, the lever is secured in the respective shift position while in the release position, the selector lever can be pivoted to another shift position. The lever can be released from the stop position with the aid of the stop bar. The stop bar for a selector lever disclosed in German Patent 195 06 766 C1 is actuated with an actuating part designed as pushbutton. The actuating part can be moved inside a guide channel of the handle, crosswise to the axial direction or the movement direction of the stop bar. A pivoting lever is mounted on the actuating part, which can be pivoted in a plane defined by the axial direction and the actuating direction. The pivoting lever for one exemplary embodiment of the known selector lever is designed with one arm and, upon depressing the pushbutton, makes contact with its free end with a slanted surface arranged inside the handle. The pivoting lever extends through the stop bar end that projects into the guide channel of the handle and lifts up the stop bar with a slanted region of the lever arm. As a result, the selector lever is released from the stop position.

The particular disadvantage of the known selector lever is that in addition to its involved assembly, the stop bar is admitted with a force component that is effective crosswise to its longitudinal axis or crosswise to the axial direction. This transverse load increases the force for lifting the stop bar. In addition, the guidance of the stop bar inside the hollow shaft is subject to increased wear.

Starting with this, it is the object of the invention to propose a selector lever that does not have said disadvantages.

The solution involves a selector lever having the features listed in claim 1. Based on this, the actuating part has at least one slanted surface that cooperates in the manner of a wedge-type sliding gear with a counter surface on a sliding piece, which is forcibly guided inside the handle in movement direction of the stop bar or in axial direction. This sliding piece is movement-connected to the actuation end of the stop bar facing the handle, via a connection that is not free of play or is movable in actuation direction. Wedge-type sliding gears of the type mentioned herein are described, for example, in "KONSTRUKTIONS-ELEMENTE DER FEINMECHANIK" [Design Elements in Precision Engineering], Carl Hauser Publishing House, 1993, pages 105, 537. They comprise a driving member with a wedge-type surface and a power take-off part with a counter surface that cooperates with the wedge-type surface. The power take-off part or the sliding piece of such a wedge-type sliding gear is guided restrictively in a crosswise to the movement direction of the driving part or the actuating part. When cooperating with the slanted surface of the actuating part, the sliding piece is admitted with a force component that is effective in actuating direction. To avoid such a transverse load on the stop bar, the invention suggests using a separate sliding member and not the stop bar for the sliding piece. This separate sliding member is movement-connected to the actuating end of the stop bar that is facing the handle, via a connection that is not free of play or is movable in actuating direction. The force component effective in actuating direction is thus absorbed by the sliding piece or a guide surface of the handle that cooperates with this sliding piece in the manner of a restrictive guide. A transfer of this force component to the stop bar is effectively excluded, owing to the fact that the movement connection between sliding piece and actuating end of the stop bar in actuating direction is not free of play, in other words it is movable.

Advantageous embodiments of the invention are specified in the dependent claims.

Figure 2:
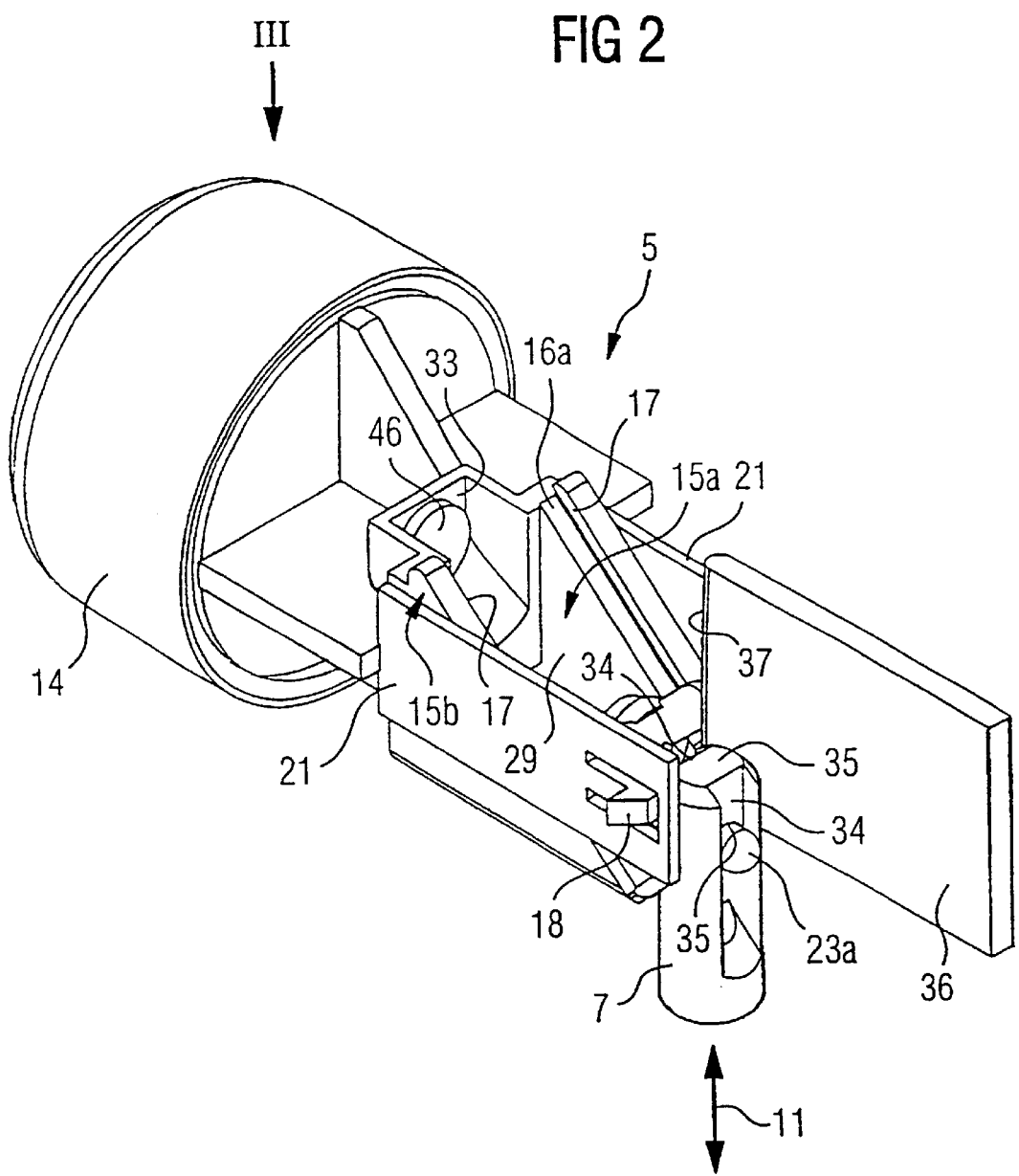
Figure 3:
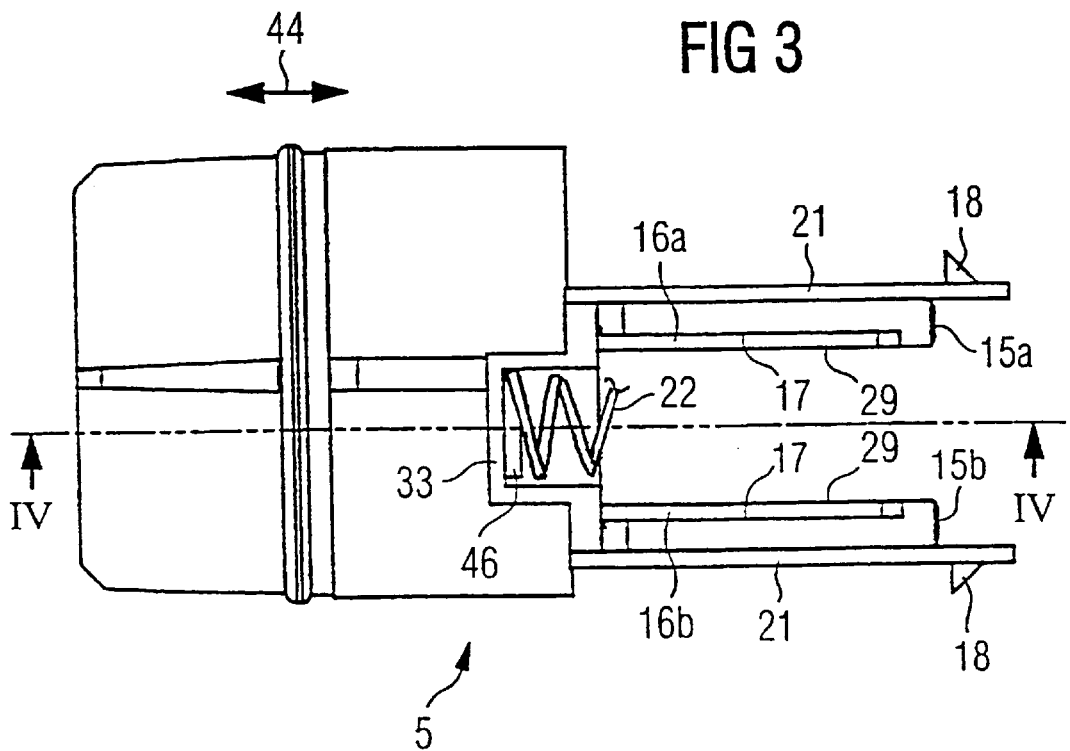
Figure 4:
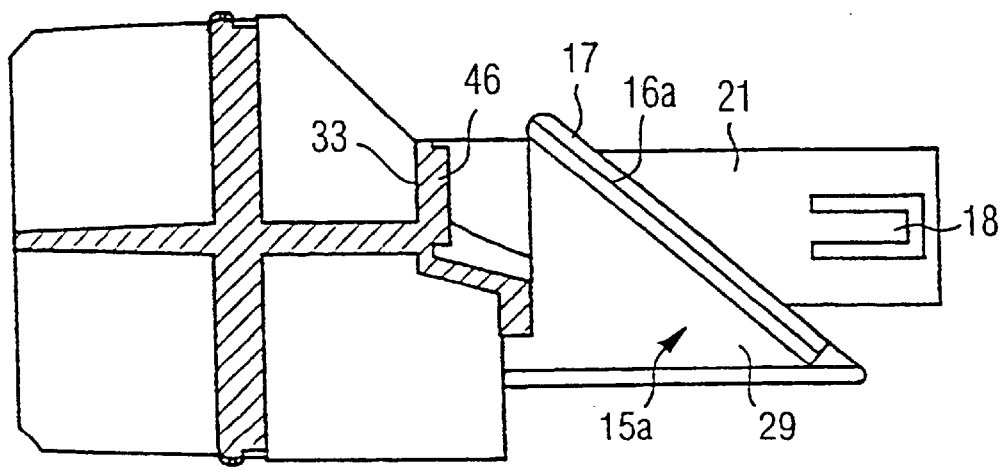
Figure 5:
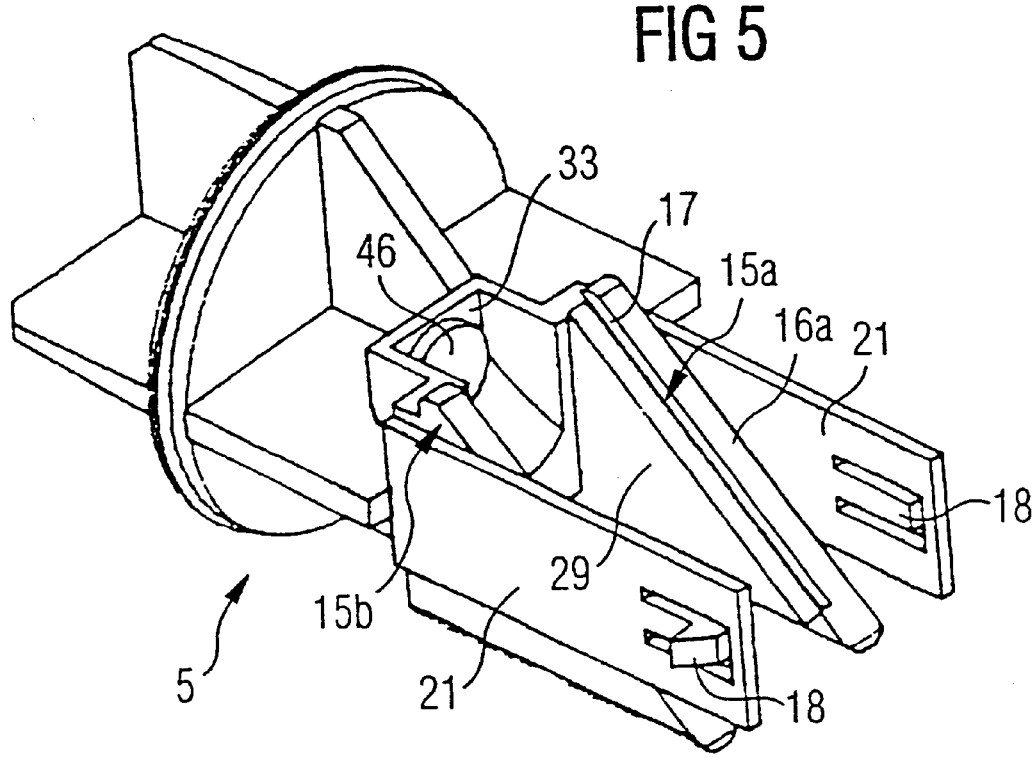
Figure 6:
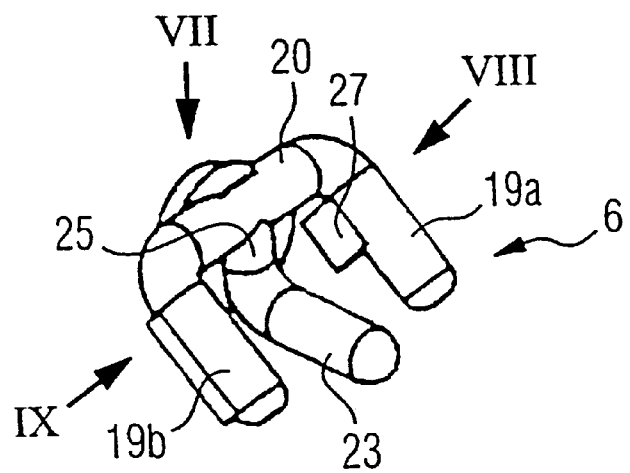
Figure 9:
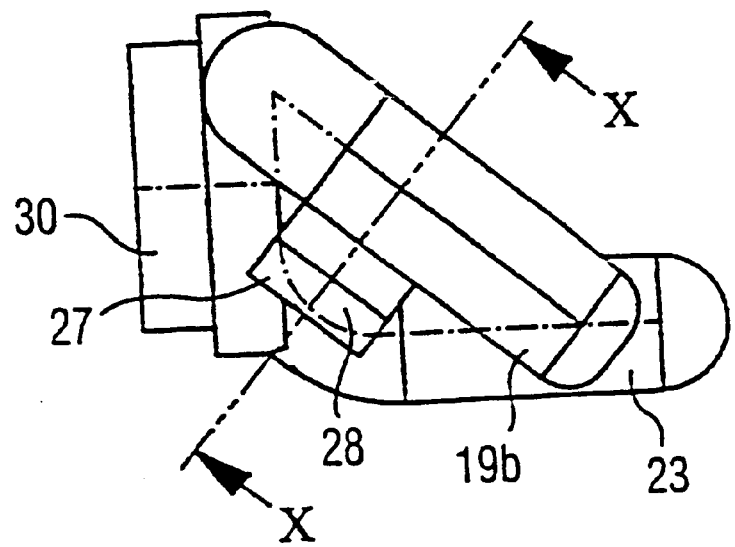
Figure 10:
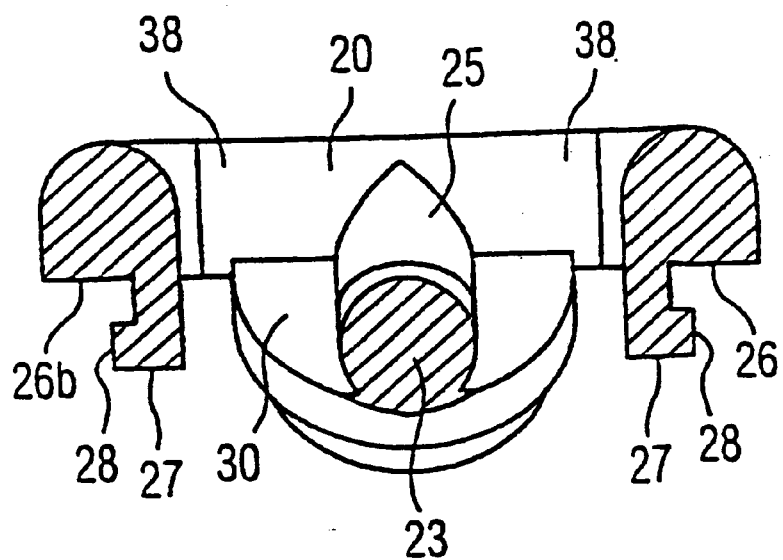
Figure 11:
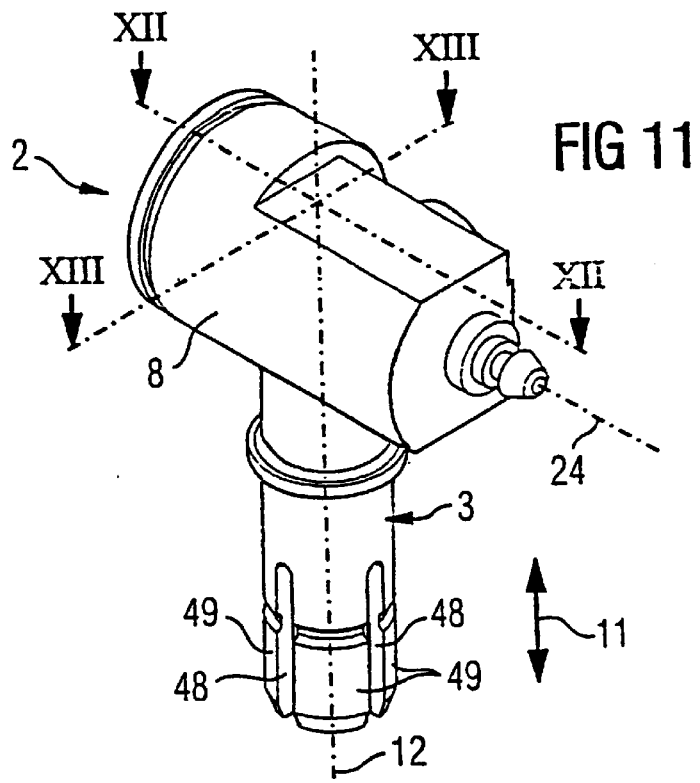
Figure 12:
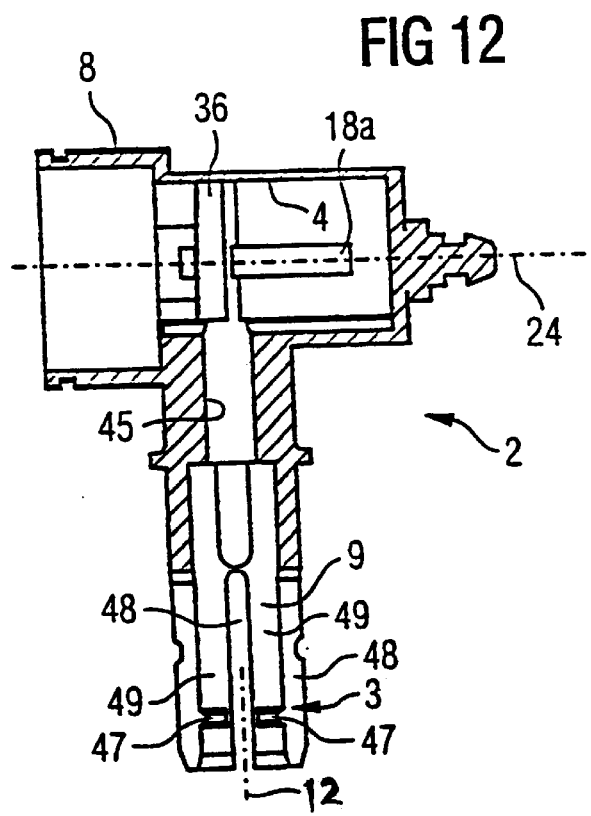

The invention is explained in further detail with the aid of an exemplary embodiment shown in the enclosed drawings. Shown are in:

FIG. 1 A perspective view of a selector lever according to the invention, in a partial section;

FIG. 2 A perspective view of an actuating part, a coupling part, of the actuating end of a stop bar in an operative assembly;

FIG. 3 A view from above of the actuating part according to FIG. 2, in the direction of arrow III in FIG. 2;

FIG. 4 A cross section along the line IV—IV in FIG. 3;

FIG. 5 An actuating part without push button in a perspective view;

FIG. 6 A perspective view of a sliding piece;

FIG. 7 A view from above in the direction of arrow VII in FIG. 6;

FIG. 8 A view from above in the direction of arrow VIII in FIG. 6;

FIG. 9 A view from the side in the direction of arrow IX in FIG. 6;

FIG. 10 A section along the line X—X in FIG. 9;

FIG. 11 The base housing for a selector lever handle;

FIG. 12 A sectional view corresponding to line XII—XII in FIG. 11, and

Figure 13:
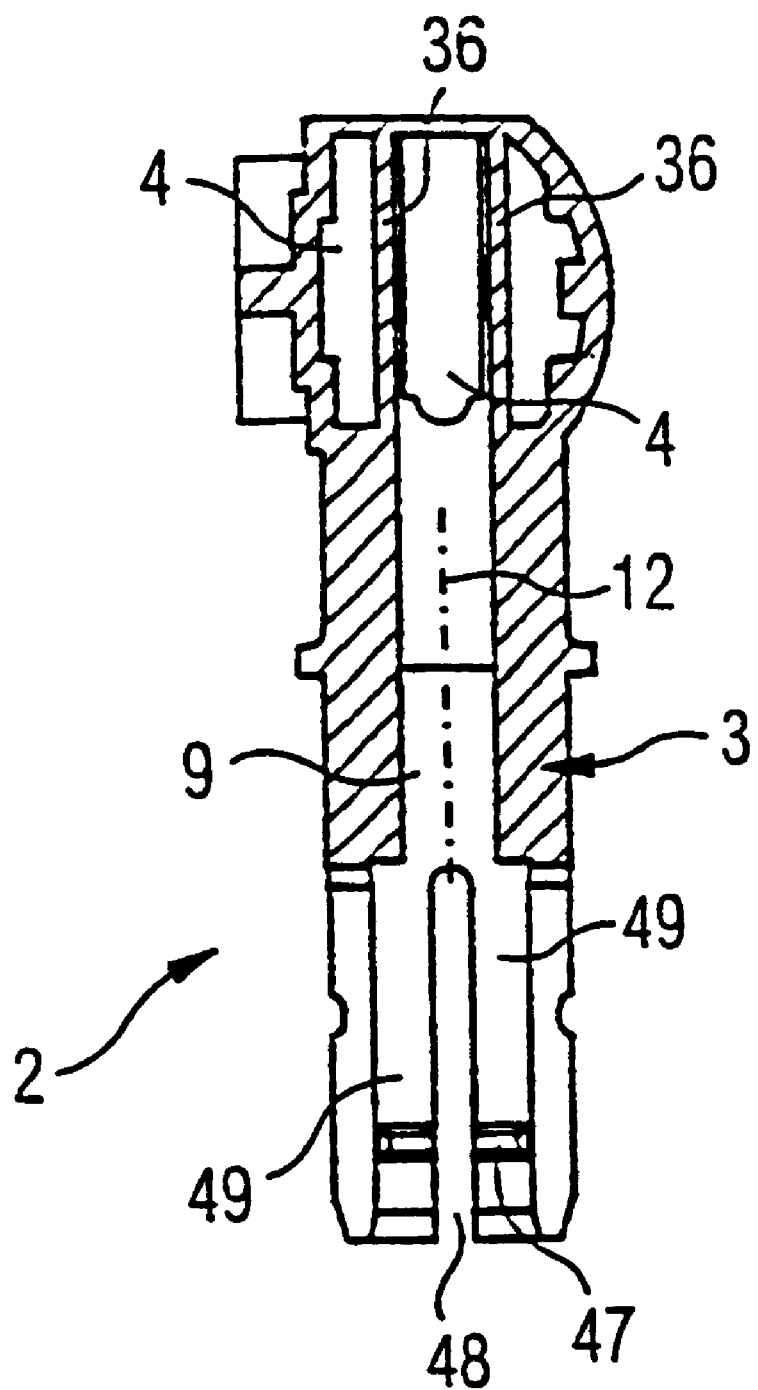

FIG. 13 A sectional view corresponding to line XIII—XIII in FIG. 11.

A selector lever 1 according to the invention essentially comprises a base housing 2 with a hollow shaft 3 formed onto it, an actuating part 5 that is guided movably inside a guide channel 4 (FIG. 12) of the base housing, a combination sliding piece 6 and stop bar, for which the actuating end 7 that extends into the guide channel 4 or faces this guide channel is shown as representative for the complete stop bar in the respective illustrations.

The base housing essentially is a tube 8 that is closed on one side, the inside area of which forms the guide channel 4. The hollow shaft 3 is formed onto the tube, wherein its inside space, which empties into the guide channel 4, accommodates the stop bar (not shown). A casing 10 surrounds the tube 8 of base housing 2 and the hollow shaft region that adjoins the tube, wherein the tube together with the corresponding part of casing 10 forms a handle 13. The center longitudinal axis 12 of the inside space 9 or the hollow shaft 3 essentially extends at a right angle to the center longitudinal axis 24 of the guide channel or the handle.

The actuating part 5 is provided with a pushbutton 14 at one end, while the other end is designed to have two parallel arms 15a, 15b that are arranged at a distance to each other. The two arms 15a, 15b are essentially plate-shaped designs, having the outline of a right-angled triangle, wherein the edge and narrow side that form the hypotenuse of the triangle and, in the assembled state, point away from the hollow shaft 3 form a wedge-type surface 16a, 16b. The wedge-type surfaces point away from the hollow shaft 3 and are limited toward the outside by a stop shoulder 17 that projects at a right angle from its plane surface. Approximately rectangular side brackets 21 are formed onto the outside surfaces of the arms 15a, 15b. Fixing projections 18 are located on the outside, near the free ends of these brackets. The projections engage in corresponding recesses 18a in the base housing 2 and secure the actuating part in an extended, pre-assembly position in which the pushbutton 14 projects from the handle 13, approximately as shown in FIG. 1.

The sliding piece 6 is essentially a C-shaped yoke with a coupling pin 23 formed onto the center leg 20 that connects the two side legs 19a, 19b. In the assembled state, the coupling pin extends away from the actuating part 5, in the direction of the center longitudinal axis 24 of handle 13 or in actuating direction 25. The actuating pin essentially has a cylindrical design and, on the end facing away from its free end, turns into a segment 25 that projects approximately at a right angle and is formed onto the center leg 20. A counter surface 26a or 26b is provided on the underside of side legs 19a, 19b, which face the hollow shaft 3 in the assembled state. This counter surface cooperates with the corresponding wedge-type surface 16a or 16b of the actuating part 5 in the manner of a sliding pair or a wedge-type sliding gear. A stop 27 projects from the edge region of counter surfaces 26a, 26b that faces the connecting pin 23, which stop operates jointly with a stop surface 28 on the insides 29 of arms 15a, 15b of actuating part 5. An approximately circular fixing disk 30 is formed onto the center leg 20, adjacent to the connecting pin 23, which serves as end support and holder for a compression spring 22. On the other end, the compression spring 22 is supported by a support wall 33 that connects the two arms 15a, 15b at the end carrying the pushbutton 14.

The actuating end 7 of the stop bar essentially has a cylindrical design and contains two diametrically opposite arranged grooves 34 that extend up to its front 35. The actuating end 7 furthermore has a through opening 31, preferably designed as elongated hole, which extends in actuating direction 25 [sic] and through which the coupling pin 23 extends. The side legs 19a, 19b flank the actuating end 7 at a radial distance. A housing wall 36 is respectively arranged between a side leg 19a, 19b and the actuating end. The flat surface of this housing wall extends in a plane that is parallel to the plane formed by the center longitudinal axis 12 and the center longitudinal axis 24 (compare in particular FIGS. 1 and 2). The narrow side of this wall, which faces the center leg 20, is rounded and functions as guide surface 37, together with the circumferential region 38 of center leg 20 of the sliding piece 6, in the manner of a sliding guide that is effective in the direction of center longitudinal axis 12.

A selector lever 1 according to the invention operates as follows: With the embodiment described in the above, the stop bar is spring-loaded in stop direction 39 (FIG. 1), the wedge-type surfaces 16a, 16b point in the opposite direction, namely in release direction 43. The selector lever is locked in place for the position shown in FIG. 1. If the pushbutton 14 is pushed into the base housing 2 in the direction of arrow 40, the arms 15a, 15b move in the same direction. As a result, the sliding piece 6 is moved in release direction 43, owing to the fact that its counter surfaces 26a, 26b cooperate with the slanted surfaces 16a, 16b of arms 15a, 15b in the manner of a wedge-type-sliding gear. Accordingly, the actuation end 7 or the stop bar is carried along in the same direction by the coupling pin 23. Once the pushbutton 14 is depressed completely, the stop bar is in the release position, in which the stop device for the selector lever can be pivoted freely inside a shift component (not shown here). With wedge-type sliding gears of the type described here, actuating the pushbutton 14 generally means that the pressure force effective in arrow direction 40 is separated into a force component effective in arrow direction 40 and a force component effective in release direction 43. The force component effective in arrow direction 40 is absorbed by the guide surface 37 of housing wall 36. Any effect of this force component on the actuating end 7 or the stop bar is prevented by the fact that the connection between actuating end 7 and coupling pin 23 is not free of play in actuating direction 44. The coupling pin 23 thus is guided movably at the actuating end 7 of the stop bar in actuating direction. The actuating end 7, through which the coupling pin 23 extends, thus can so-to-speak drift back and forth in actuating direction 44. As a result, the guide 45 for the stop bar or the actuating end 7 inside the hollow shaft 3 is practically free of all transverse loads. On the one hand this reduces the pushbutton actuating forces and, on the other hand, it reduces the wear on guide 45.

The following steps are taken to assemble a selector lever according to the invention: the actuating part 5 that is provided with a coupling part 6 is pushed into the guide channel 4 and is held there in a pre-assembly position by means of a (not shown) mounting template. In this pre-assembly position, the coupling pin 23 does not yet project into the movement path of the actuation end 7 of the stop bar. The compression spring 22, previously mentioned in the above, is used to secure the coupling part 6 to the actuation part 5. The spring is clamped with one of its winding ends around the fastening disk 30 at the coupling part 6 and with the other winding end is clamped around a fastening disk 46 at the support wall 33. The stop bar is attached to the shift component, not shown here, which is arranged adjacent to the driver's seat in a motor vehicle and is also mentioned in the above. For the assembly, the handle with its hollow shaft 3, which is pre-assembled in the known manner, is fitted onto the stop bar. This fitting-on movement is limited by a ring-shaped, radial projection 47 on the hollow shaft inside that engages in a corresponding recess in the stop bar (not shown). In order to make it easier to fit the hollow shaft 3 onto the stop bar, its lower end is designed to have axial slots 48 in the form of spring tongues 49. Once the aforementioned stop position is reached, meaning if the ring-shaped projection 47 is latched in, the actuating end 7 is in an axial position in which its through opening 35 is aligned with the coupling pin 23. The assembly template (not shown) is removed, thereby making it possible to insert the actuating part 5 further into the guide channel, in arrow direction 40. At the end of this inserting movement, the coupling pin 23 extends through the through opening 35 [sic]. The fixing noses 28 of the actuating part 5 engage in the recesses 18a of the base housing 2 (not shown). The actuating part 5 is thus secured non-detachable inside the base housing 2, but can be moved by a distance corresponding to the length of the recesses 18a. The side brackets 21 in this case serve to guide the actuating part 5. The spring that is supported on the support wall 33 and the sliding piece 6 ensures that the center leg 20 of sliding piece 6 always rests against the guide surface 37 of housing walls 36. In this way, it is ensured that the pushbutton 14 can be actuated without idle stroke.

What is claimed is:

1. A selector lever for an automatic transmission, comprising
   a handle (13) with thereon arranged hollow shaft (3),
   a stop bar that can be moved inside the hollow shaft (3) in axial direction (11) between a stop position and a release position, wherein the selector lever (1) in the release position of the stop bar can be pivoted into different shift positions and in the stop position is fixed in the selected shift position, an actuating part (5) that is guided inside the handle (13) in an actuating direction (44), which extends crosswise to the axial direction (11), said actuating part being used to move the stop bar to the release position or the stop position, characterized by at least one wedge-type surface (16a, 16b) on the actuating part (5) and at least one counter surface (26a, 26b) that operates jointly with the wedge-type surface in the manner of a wedge-type sliding gear and is located on a sliding piece (6) moved in axial direction (11) inside the handle (13) along a guide surface (37) of the handle, said sliding piece being connected to the actuating end (7) of the stop bar that projects into the handle (13), such that the actuating end (7) is guided movably on the sliding piece (6) in actuating direction (44).

2. A selector lever according to claim 1, characterized in that the sliding piece (6) has a coupling pin (23) that extends in actuating direction (44) and also extends through a through opening (31) in the actuating end (7) of the stop bar.

3. A selector lever according to claim 2, characterized in that the free end of the coupling pin (23) points away from the actuating part (5).

4. A selector lever according to claim 2, characterized in that the sliding piece is an essentially C-shaped yoke, having respectively one counter surface (26a, 26b) arranged on the side legs (19a, 19b), which counter surface cooperates with an associated wedge-type surface (16a, 16b) of the actuating part (5) and further having the coupling pin (23) formed onto its center leg (20).

5. A selector lever according to claim 4, characterized in that in the assembled state, the side legs (19a, 19b) flank the actuating end (7) of the stop bar with a radial distance, wherein respectively one guide surface (37) that extends in axial direction (11) is respectively arranged between the actuating end characterized in that the sliding piece (6) has a coupling pin (23) that extends in actuating direction (44) and also extends through a through opening (31) in the actuating end (7) of the stop bar.

6. A selector lever according to claim 2, characterized in that the free end of the coupling pin (23) points away from the actuating part (5).

* * * * *

UNITED STATES PATENT AND TRADEMARK OFFICE
CERTIFICATE OF CORRECTION

PATENT NO.   : 6,298,743 B1
DATED        : October 9, 2001
INVENTOR(S)  : Heinz Horn et al.

It is certified that error appears in the above-identified patent and that said Letters Patent is hereby corrected as shown below:

<u>Title page,</u>
Item [73], Assignee, should read -- Kunststoff --.

<u>Column 6,</u>
Lines 9 through 25, claims 5 and 6, should read as follows:
-- 5.   A selector lever according to claim 4, characterized in that in the assembled state, the side legs (19a, 19b) flank the actuating end (7) of the stop bar with a radial distance, wherein respectively one guide surface (37) that extends in axial direction (11) is respectively arranged between the actuating end (7) and one side leg (19a, 19b), with which the center leg (20) of the sliding piece (6) cooperates in the manner of an axially effective sliding guide.

6.   A selector lever according to claim 5, characterized in that the sliding piece (6) is admitted by a compression spring (22) that is supported on the actuating part. --

Beginning at Line 26, insert claims 7 and 8 to read as follows:
-- 7.   A selector lever according to claim 4, characterized in that the actuating part (5) has arms (15a, 15b) that extend in actuating direction (44) and are arranged at a distance to each other, which arms have a wedge-type surface (16a, 16b) that cooperates with a corresponding counter surface (26a, 26b) of a side leg (19a, 19b) of the sliding piece (6).

UNITED STATES PATENT AND TRADEMARK OFFICE
CERTIFICATE OF CORRECTION

PATENT NO. : 6,298,743 B1
DATED : October 9, 2001
INVENTOR(S) : Heinz Horn et al.

It is certified that error appears in the above-identified patent and that said Letters Patent is hereby corrected as shown below:

8. A selector lever according to claim 1, characterized in that the stop bar in stop direction (39) is admitted by a spring and that the at least one wedge-type surface (16a, 16b) on the actuating part (5) points in release direction (43) or is effective in release direction. --

Signed and Sealed this

Tenth Day of September, 2002

Attest:

JAMES E. ROGAN
Attesting Officer
Director of the United States Patent and Trademark Office